United States Patent
Miyake et al.

(10) Patent No.: US 12,466,468 B2
(45) Date of Patent: Nov. 11, 2025

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Junya Miyake, Okazaki (JP); Atsushi Ishihara, Sakurai (JP); Yusuke Kakimoto, Okazaki (JP); Hidetsugu Toyama, Susono (JP); Tomoyuki Iida, Nissin (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 18/181,102

(22) Filed: Mar. 9, 2023

(65) Prior Publication Data
US 2023/0286569 A1 Sep. 14, 2023

(30) Foreign Application Priority Data

Mar. 9, 2022 (JP) ................................. 2022-036059

(51) Int. Cl.
*B62D 5/04* (2006.01)
*B62D 5/00* (2006.01)
(Continued)

(52) U.S. Cl.
CPC .......... *B62D 5/0421* (2013.01); *B62D 5/001* (2013.01); *B62D 5/0424* (2013.01);
(Continued)

(58) Field of Classification Search
CPC .. B62D 15/0275; B62D 6/008; B62D 5/0421; B62D 5/0424
(Continued)

(56) References Cited

U.S. PATENT DOCUMENTS 6,008,599 A * 12/1999 Beck ..................... B62D 5/0463
318/400.29
7,295,227 B1 * 11/2007 Asahi ................. B62D 15/0275
348/E7.087
(Continued)

FOREIGN PATENT DOCUMENTS

EP          4 183 663 A1      5/2023
JP        2007161005 A   *  6/2007
(Continued)

OTHER PUBLICATIONS

Jan. 26, 2024 Office Action issued in European Patent Application No. 23 160 654.2.
(Continued)

*Primary Examiner* — Phutthiwat Wongwian
*Assistant Examiner* — Brian R Kirby
(74) *Attorney, Agent, or Firm* — Oliff PLC (57) ABSTRACT

A steering control device calculates a target angle of a shaft that rotates in conjunction with a turning operation of a turning wheel that is isolated from dynamic power transmission with a steering wheel, depending on a steering state of the steering wheel, and executes a feedback control to cause an actual angle to follow the target angle, for controlling electricity supply to a turning motor to turn the turning wheel, the steering control device including: a first processing unit to execute a process to alter the target angle independently of the steering state of the steering wheel; and a second processing unit to calculate a turning state amount for a guide monitor function to assist traveling of a vehicle, by reducing or removing an influence of an alteration of the target angle on the actual angle of the shaft.

10 Claims, 4 Drawing Sheets

(51) Int. Cl.
 *B62D 6/00* (2006.01)
 *B62D 15/02* (2006.01)
(52) U.S. Cl.
 CPC ........... *B62D 5/0463* (2013.01); *B62D 6/008* (2013.01); *B62D 15/0275* (2013.01)
(58) Field of Classification Search
 USPC ..................................................... 701/41, 42
 See application file for complete search history.

(56) References Cited

U.S. PATENT DOCUMENTS

| | | | | |
|---|---|---|---|---|
| 8,717,438 | B2* | 5/2014 | Hosoi | B62D 15/0275 |
| | | | | 348/148 |
| 10,065,639 | B2* | 9/2018 | Taniguchi | B62D 15/025 |
| 2004/0153243 | A1* | 8/2004 | Shimazaki | B62D 15/0275 |
| | | | | 701/1 |
| 2005/0027415 | A1* | 2/2005 | Iwazaki | B62D 15/0285 |
| | | | | 701/41 |
| 2005/0224276 | A1* | 10/2005 | Sugitani | B62D 6/008 |
| | | | | 180/402 |
| 2006/0009894 | A1* | 1/2006 | Goto | B62D 6/003 |
| | | | | 701/41 |
| 2006/0247834 | A1* | 11/2006 | Shimazaki | B62D 15/0275 |
| | | | | 701/1 |
| 2007/0299583 | A1* | 12/2007 | Fujita | B60T 8/1755 |
| | | | | 180/443 |
| 2010/0283633 | A1 | 11/2010 | Becker et al. | |
| 2012/0330510 | A1* | 12/2012 | Kawase | B62D 5/0469 |
| | | | | 701/41 |
| 2013/0041557 | A1* | 2/2013 | Endo | B62D 6/002 |
| | | | | 701/42 |
| 2015/0329142 | A1* | 11/2015 | Takeda | B62D 6/003 |
| | | | | 701/41 |
| 2017/0057542 | A1* | 3/2017 | Kim | G05D 1/0088 |
| 2018/0304920 | A1 | 10/2018 | Hirate et al. | |
| 2019/0367083 | A1* | 12/2019 | Kodera | B62D 6/04 |
| 2020/0023696 | A1 | 1/2020 | Ling et al. | |
| 2020/0180681 | A1* | 6/2020 | Toyama | B62D 5/005 |
| 2020/0283059 | A1 | 9/2020 | Kodera et al. | |
| 2020/0324808 | A1* | 10/2020 | Kodera | B62D 5/0463 |
| 2021/0016830 | A1* | 1/2021 | Riese | B62D 6/008 |
| 2022/0017143 | A1 | 1/2022 | Shoji et al. | |

FOREIGN PATENT DOCUMENTS

| | | |
|---|---|---|
| JP | 2011-230594 A | 11/2011 |
| JP | 2020-142596 A | 9/2020 |
| JP | 2021-175317 A | 11/2021 |
| WO | 2022/016553 A1 | 1/2022 |

OTHER PUBLICATIONS

Jul. 13, 2023 Extended Search Report issued in European Patent Application No. 23160654.2.

* cited by examiner

STEERING CONTROL DEVICE

CROSS-REFERENCE TO RELATED APPLICATION

This application claims priority to Japanese Patent Application No. 2022-036059 filed on Mar. 9, 2022, incorporated herein by reference in its entirety.

BACKGROUND

1. Technical Field

The present disclosure relates to a steering control device.

2. Description of Related Art

Conventionally, there is a so-called steer-by-wire steering device in which dynamic power is not transmitted between a steering wheel and turning wheels. The steering device includes a reaction motor that is a generation source of a steering reaction force to be given to the steering shaft and a turning motor that is generation source of a turning force to turn the turning wheels. At the time of traveling of a vehicle, a control device of the steering device generates the steering reaction force through an electricity supply control for the reaction motor, and turns the turning wheels through an electricity supply control for the turning motor.

For example, a control device in Japanese Unexamined Patent Application Publication No. 2020-142596 calculates a target value of a pinion angle that corresponds to a rudder angle ratio, based on the steering angle of the steering wheel. The pinion angle is the rotation angle of a pinion shaft that engages with a turning shaft to turn the turning wheels. The rudder angle ratio is the ratio of the turning angle to the steering angle. The control device executes the feedback control of the pinion angle such that the pinion angle to be calculated based on the rotation angle of the turning motor follows the target value of the pinion angle.

Further, conventionally, there is a parking assistance device that assists the parking of a vehicle. For example, a parking assistance device in Japanese Unexamined Patent Application Publication No. 2011-230594 includes a camera and a back guide monitor. The camera takes images of a rearward view of the vehicle. In the case of the rearward parking of the vehicle, the back guide monitor sets a target parking marker to a parking space. The target parking marker and the steering of the steering wheel coordinate with each other. A driver decides the steering amount of the steering wheel while checking the target parking marker.

SUMMARY

In the steer-by-wire steering device, dynamic power is not transmitted between the steering wheel and the turning wheels. Therefore, there is a possibility that the back guide monitor displays a guide for assisting the rearward movement of the vehicle based on the turning state of the turning wheels, for example. In this case, there is a concern described below.

For the convenience of the steering device or from a standpoint of the product specification, the control device sometimes executes a control for purposely altering the turning angle independently of the steering of the steering wheel. In the case where the turning angle altered independently of the steering of the steering wheel is reflected on the guide display, the driver may have a strangeness feeling.

A steering control device according to an aspect of the present disclosure calculates a target angle of a shaft depending on a steering state of a steering wheel and executes a feedback control to cause an actual angle to follow the target angle, for controlling electricity supply to a turning motor, the shaft rotating in conjunction with a turning operation of a turning wheel of a vehicle, the turning wheel being isolated from dynamic power transmission with the steering wheel, the turning motor generating a turning force for turning the turning wheel. The steering control device includes a first processing unit and a second processing unit. The first processing unit executes a process to alter the target angle independently of the steering state of the steering wheel. The second processing unit calculates a turning state amount for a guide monitor function by reducing or removing an influence of an alteration of the target angle by the first processing unit on the actual angle of the shaft, the guide monitor function being a function to assist traveling of the vehicle.

With this configuration, by the execution of the process by the second processing unit, the turning state amount for the guide monitor function in which the influence of the alteration of the target angle by the first processing unit has been reduced or removed is obtained. The turning state amount is used for the guide display for assisting the traveling of the vehicle, and thereby, the guide monitor display based on the turning state amount depending on the steering state of the steering wheel is performed. Therefore, it is possible to restrain the driver from having a strangeness feeling at the time of the guide display for assisting the traveling of the vehicle.

In the steering control device according to the above aspect, the second processing unit may calculate the turning state amount by calculating a change amount of the target angle due to the process by the first processing unit and subtracting the change amount of the target angle from the actual angle of the shaft or the target angle based on the steering state of the steering wheel.

With this configuration, it is possible to easily calculate the turning state amount that is used for the guide monitor display, by subtracting the change amount of the target angle of the shaft due to the process by the first processing unit from the actual angle of the shaft or the target angle based on the steering state of the steering wheel.

In the steering control device according to the above aspect, when a vehicle electric power source is switched on, the first processing unit may execute a first alteration process to calculate an offset angle, to gradually change the offset angle toward zero by performing a gradual change process to the offset angle, and to alter the value of the target angle by adding the offset angle after the gradual change process to the target angle, the offset angle being a deviation amount between the target angle that is calculated based on the present steering angle of the steering wheel and the actual angle of the shaft that reflects an actual turning state of the turning wheel.

With this configuration, when vehicle electric power source is switched on, the offset angle is added to the target angle of the shaft while being gradually changed toward zero over time. Therefore, it is possible to restrain sudden changes in the target angle of the shaft and further the turning angle of the turning wheel. Accordingly, it is possible to restrain the driver from having a strangeness feeling.

In the steering control device according to the above aspect, the process by the second processing unit may include a process to take the offset angle after the gradual change process as a first change amount, and to calculate the turning state amount by subtracting the first change amount from the actual angle of the shaft or the target angle based on the steering state of the steering wheel.

With this configuration, by subtracting the first change amount from the actual angle of the shaft or the target angle based on the steering state of the steering wheel, it is possible to obtain the turning state amount in which the influence of the change in the target angle due to the execution of the first alteration process has been removed or reduced.

In the steering control device according to the above aspect, when a turning shaft to turn the turning wheel moves to a position in a prescribed high shaft force range, the first processing unit may further execute a second alteration process to alter the value of the target angle such that the position of the turning shaft departs from the high shaft force range to a turning neutral position side.

With this configuration, it is possible to restrain the occurrence of a situation where the output of the turning motor can become insufficient. Therefore, it is possible to restrain the driver from having a strangeness feeling caused by an insufficient output of the turning motor.

In the steering control device according to the above aspect, the process by the second processing unit may include a process to take the target angle before an execution of the second alteration process and the target angle after the execution of the second alteration process, to calculate a second change amount by subtracting the target angle before the execution of the second alteration process from the target angle after the execution of the second alteration process, and to calculate the turning state amount by subtracting the second change amount from the actual angle of the shaft or the target angle based on the steering state of the steering wheel.

With this configuration, by subtracting the second change amount from the actual angle of the shaft or the target angle based on the steering state of the steering wheel, it is possible to obtain the turning state amount in which the influence of the change in the target angle due to the execution of the second alteration process has been removed.

In the steering control device according to the above aspect, the first processing unit may further execute a third alteration process to alter the value of the target angle for reducing residual current that is generated in the turning motor.

With this configuration, the residual current that is generated in the turning motor is reduced. Since the residual current in the turning motor is reduced, it is possible to reduce the influence of the residual current on the torque that is generated by the turning motor.

In the steering control device according to the above aspect, the process by the second processing unit may include a process to take the target angle before an execution of the third alteration process and the target angle after the execution of the third alteration process, to calculate a third change amount by subtracting the target angle before the execution of the third alteration process from the target angle after the execution of the third alteration process, and to calculate the turning state amount by subtracting the third change amount from the actual angle of the shaft or the target angle based on the steering state of the steering wheel.

With this configuration, by subtracting the third change amount from the actual angle of the shaft or the target angle based on the steering state of the steering wheel, it is possible to obtain the turning state amount in which the influence of the change in the target angle due to the execution of the third alteration process has been removed.

In the steering control device according to the above aspect, the turning state amount may be the rotation angle of a pinion shaft that engages with a turning shaft to turn the turning wheel. With this configuration, the rotation angle of the pinion shaft that engages with the turning shaft is a state variable that reflects the turning state of the turning wheel.

With the steering control device in the present disclosure, it is possible to restrain the driver from having a strangeness feeling at the time of the guide display for assisting the traveling of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a steering control device will be described below.

Whole Configuration

Figure 1:
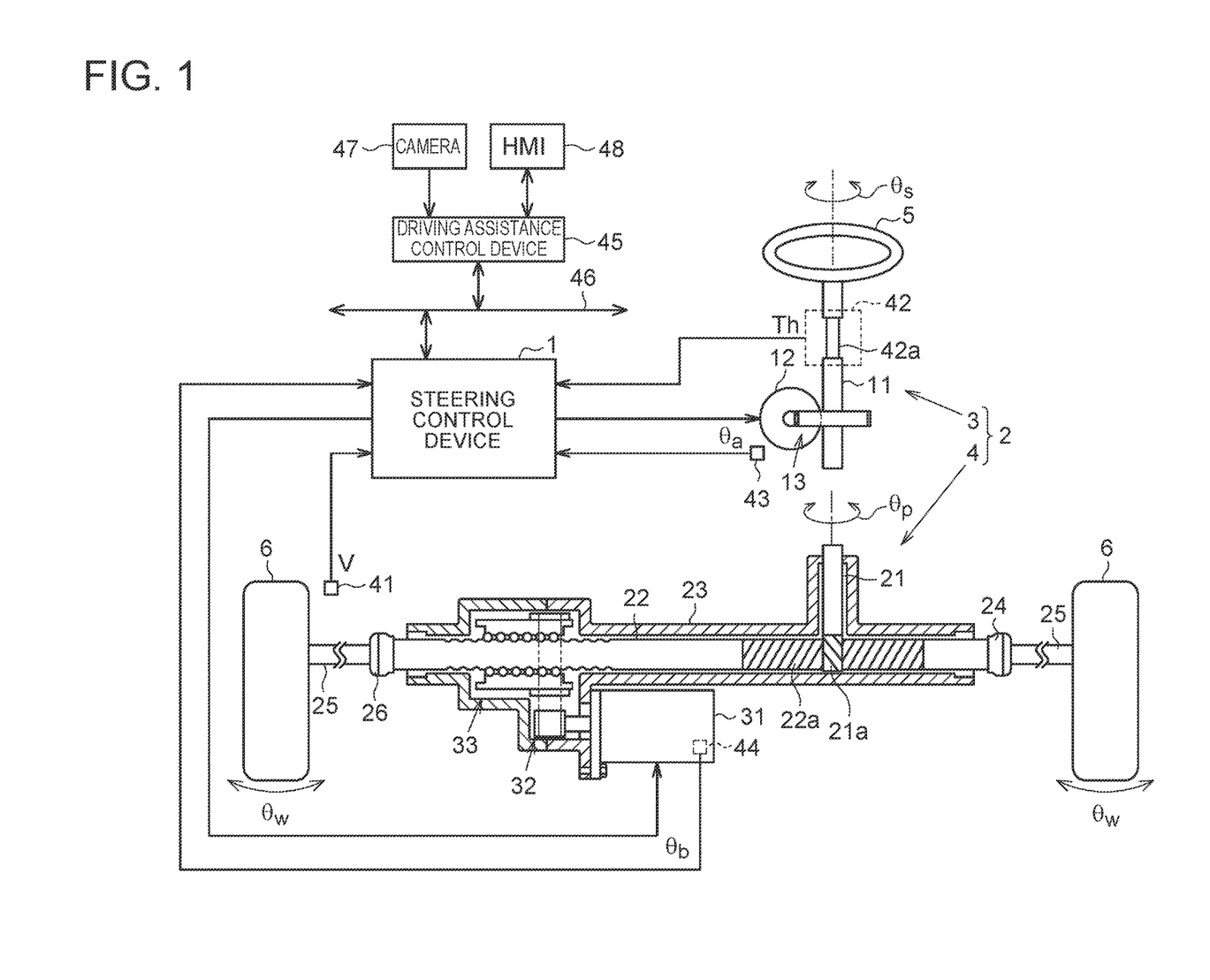
FIG. 1 is a configuration diagram of a steer-by-wire steering device equipped with an embodiment of a steering control device.

As shown in FIG. 1, a control object of a steering control device 1 is a steer-by-wire steering device 2. The steering device 2 includes a steering mechanism 3 and a turning mechanism 4. The steering mechanism 3 is a mechanism part that is steered by a driver through a steering wheel 5. The turning mechanism 4 is a mechanism part that turns turning wheels 6 of a vehicle in response to the steering of the steering wheel 5.

The steering mechanism 3 includes a steering shaft 11, a reaction motor 12 and a speed reducer 13. The steering wheel 5 is coupled to the steering shaft 11 in an integrally rotatable manner. The reaction motor 12 is a generation source of a steering reaction force that is given to the steering shaft 11. The steering reaction force is a force in the opposite direction of the steering direction of the steering wheel 5. For example, the reaction motor 12 is a three-phase brushless motor. The speed reducer 13 reduces the speed of the rotation of the reaction motor 12, and transmits the rotation after the speed reduction, to the steering shaft 11.

The turning mechanism 4 includes a pinion shaft 21, a turning shaft 22 and a housing 23. The housing 23 supports the pinion shaft 21 in a rotatable manner. Further, the housing 23 contains the turning shaft 22 in a manner which allows reciprocating. The pinion shaft 21 is provided so as to cross the turning shaft 22. A pinion tooth 21a of the pinion shaft 21 engages with a rack tooth 22a of the turning shaft 22. Tie rods 25 are coupled to both ends of the turning shaft 22 through rack ends 24 constituted by ball joints. Distal ends of the tie rods 25 are coupled with unillustrated knuckles provided with the turning wheels 6.

The turning mechanism 4 includes a turning motor 31, a transmission mechanism 32 and a transformation mechanism 33. The turning motor 31 is a generation source of a turning force that is given to the turning shaft 22. The turning force is a force for turning the turning wheel 6. For example, the turning motor 31 is a three-phase brushless motor. For example, the transmission mechanism 32 is a belt transmission mechanism. The transmission mechanism 32 transmits the rotation of the turning motor 31 to the transformation mechanism 33. For example, the transformation mechanism 33 is a ball screw mechanism. The transformation mechanism 33 transforms the rotation transmitted through the transmission mechanism 32, into the motion of the turning shaft 22 in the axial direction of the turning shaft 22.

By the movement of the turning shaft 22 in the axial direction, a turning angle $\theta_w$ of the turning wheels 6 is altered. Since the pinion tooth 21a of the pinion shaft 21 engages with the rack tooth 22a of the turning shaft 22, the pinion shaft 21 rotates in conjunction with the movement of the turning shaft 22. The pinion shaft 21 is a shaft that rotates in conjunction with the turning operation of the turning wheels 6.

The steering control device 1 controls the operations of the reaction motor 12 and the turning motor 31. The steering control device 1 includes a processing circuit that includes one of the following three configurations A1, A2, A3.

A1. One or more processors that operates in accordance with a computer program as software. The processor includes a central processing unit (CPU) and a memory.

A2. One or more dedicated hardware circuits that execute at least some processes of various processes, as exemplified by an application specific integrated circuit (ASIC). The ASIC includes a CPU and a memory.

A3. Hardware circuits in which the configurations A1, A2 are combined. The memory is a medium that can be read by a computer, and stores programs in which processes or commands for the computer are written. In the embodiment, the computer is a CPU. The memory includes a random access memory (RAM) and a read only memory (ROM). The CPU executes various controls by executing programs stored in the memory with a prescribed operation period.

The steering control device 1 takes detection results of sensors equipped in the vehicle. The sensors include a vehicle velocity sensor 41, a torque sensor 42, a rotation angle sensor 43 and a rotation angle sensor 44. The vehicle velocity sensor 41 detects a vehicle velocity V. The torque sensor 42 is provided on a steering wheel 5 side relative to a coupling portion of the speed reducer 13 on the steering shaft 11. The torque sensor 42 detects a steering torque Th that is given to the steering shaft 11. The steering torque Th is calculated based on the twist amount of a torsion bar 42a that is provided in the steering shaft 11. The rotation angle sensor 43 is provided in the reaction motor 12. The rotation angle sensor 43 detects a rotation angle $\theta_a$ of the reaction motor 12. The rotation angle sensor 44 is provided in the turning motor 31. The rotation angle sensor 44 detects a rotation angle $\theta_b$ of the turning motor 31.

The steering torque Th, the rotation angle $\theta_a$ of the reaction motor 12 and the rotation angle $\theta_b$ of the turning motor 31 have positive values when the steering wheel 5 is steered to the right, and have negative values when the steering wheel 5 is steered to the left.

The steering control device 1 controls the reaction motor 12 and the turning motor 31 base on the detection results of the various sensors. The steering control device 1 controls the electricity supply to the reaction motor 12 such that the reaction motor 12 generates a steering reaction force corresponding to the steering torque Th. The steering control device 1 controls the electricity supply to the turning motor 31 such that the turning wheels 6 are turned depending on the steering state of the steering wheel 5.

Configuration of Driving Assistance Control Device 45

In some cases, the vehicle is equipped with a driving assistance system. The driving assistance system realizes a variety of driving assistance functions for further enhancing the safety or convenience of the vehicle. The vehicle includes a driving assistance control device 45 that integrally controls control devices of various in-vehicle systems. Similarly to the steering control device 1, the driving assistance control device 45 includes a processing circuit that includes one of the above-described three configurations A1, A2, A3.

The driving assistance control device 45 evaluates an optimal control method based on the state of the vehicle at that time, and commands various in-vehicle control devices to perform individual controls, depending on the evaluated control method. The driving assistance control device 45 switches the driving assistance function between an on-state and an off-state, in response to the operation of an unillustrated switch that is provided at a driver's seat or the like. The driving assistance control device 45 is connected to the steering control device 1 through an in-vehicle network 46 such as a CAN.

The driving assistance function includes a parking assist function. The parking assist function is a function to support the steering of the driver at the time of the parking into a garage. At the time of the execution of the parking assist function, the driving assistance control device 45 intervenes in a steering control by the steering control device 1. At the time of the execution of the parking assist function, the driving assistance control device 45 generates a command value $\theta^*$ for the steering control device 1, based on the traveling state of the vehicle and the peripheral situation of the vehicle.

The command value $\theta^*$ is a target value of a turning state amount that is needed for parking the vehicle at a predetermined parking position, depending on the traveling state of the vehicle and the peripheral situation of the vehicle at that time. The target value of the turning state amount is a value of the turning state amount that is to be added to the present turning state amount or the present target value of the turning state amount. The turning state amount is a state amount that reflects the turning state of the turning wheels 6, and for example, is a pinion angle $\theta_p$. In this case, the command value $\theta^*$ is an angle that is to be added to the pinion angle $\theta_p$ or the target value of the pinion angle $\theta_p$. The steering control device 1 controls the turning motor 31 based on the command value $\theta^*$ generated by the driving assistance control device 45.

The driving assistance control device 45 takes the vehicle velocity V detected by the vehicle velocity sensor 41. Further, the driving assistance control device 45 takes the turning state amount from the steering control device 1. The driving assistance control device 45 recognizes the state of the vehicle based on the vehicle velocity V and the turning state of the turning wheels 6. The driving assistance control device 45 is connected to a camera 47 that is equipped in the vehicle. The camera 47 includes a back camera that takes images of a rearward view of the vehicle. The driving assistance control device 45 recognizes the peripheral situation of the vehicle through the camera 47.

The driving assistance control device 45 is connected to a human machine interface (HMI) 48. Through the HMI 48, information is exchanged between the driver and the driving assistance control device 45. The HMI 48 includes an input device and an output device. The input device includes buttons and a touch panel through which a variety of input operations are performed. The output device includes a display on which a variety of information is displayed.

The driving assistance control device 45 has a back guide monitor function as one of the driving assistance functions. The back guide monitor function is an example of a guide monitor function, displays the image of the rearward view of the vehicle, on the display of the HMI 48, and assists a rearward movement operation for parking or the like. When the rearward movement operation of the vehicle is performed, the driving assistance control device 45 displays the image of the rearward view of the vehicle and guide lines on the display of the HMI 48. The driving assistance control device 45 recognizes that the rearward movement operation of the vehicle is performed, for example, by the switching of the shift range of a transmission to a reverse position.

For example, the guide lines include a predicted path line of the vehicle, a vehicle width extension line and a distance rough-indication line. The predicted path line is a line that roughly indicates the path of the vehicle in conjunction with the operation of the steering wheel 5 or the turning operation of the turning wheels 6. The vehicle width extension line is a line that roughly indicates a path when the vehicle moves rearward straight. The distance rough-indication line is a line that indicates a distance from a rear portion of the vehicle, for example. 0.5 meters or 1.0 meter.

The driving assistance control device 45 sets the value of a driving assistance request flag $F_B$, depending on the state of the switch for switching the driving assistance function between the on-state and the off-state and the shift range of the transmission. The driving assistance request flag $F_B$ is information indicating whether the driver has requested the driving assistance by the system. When the driving assistance function is switched on or when the shift range of the transmission is switched to the reverse position, the driving assistance control device 45 sets the value of the driving assistance request flag $F_B$ to "1". When the driving assistance function is switched off or when the shift range of the transmission is at a position other than the reverse position, the driving assistance control device 45 sets the value of the driving assistance request flag $F_B$ to "0".

Configuration of Steering Control Device 1

Figure 2:
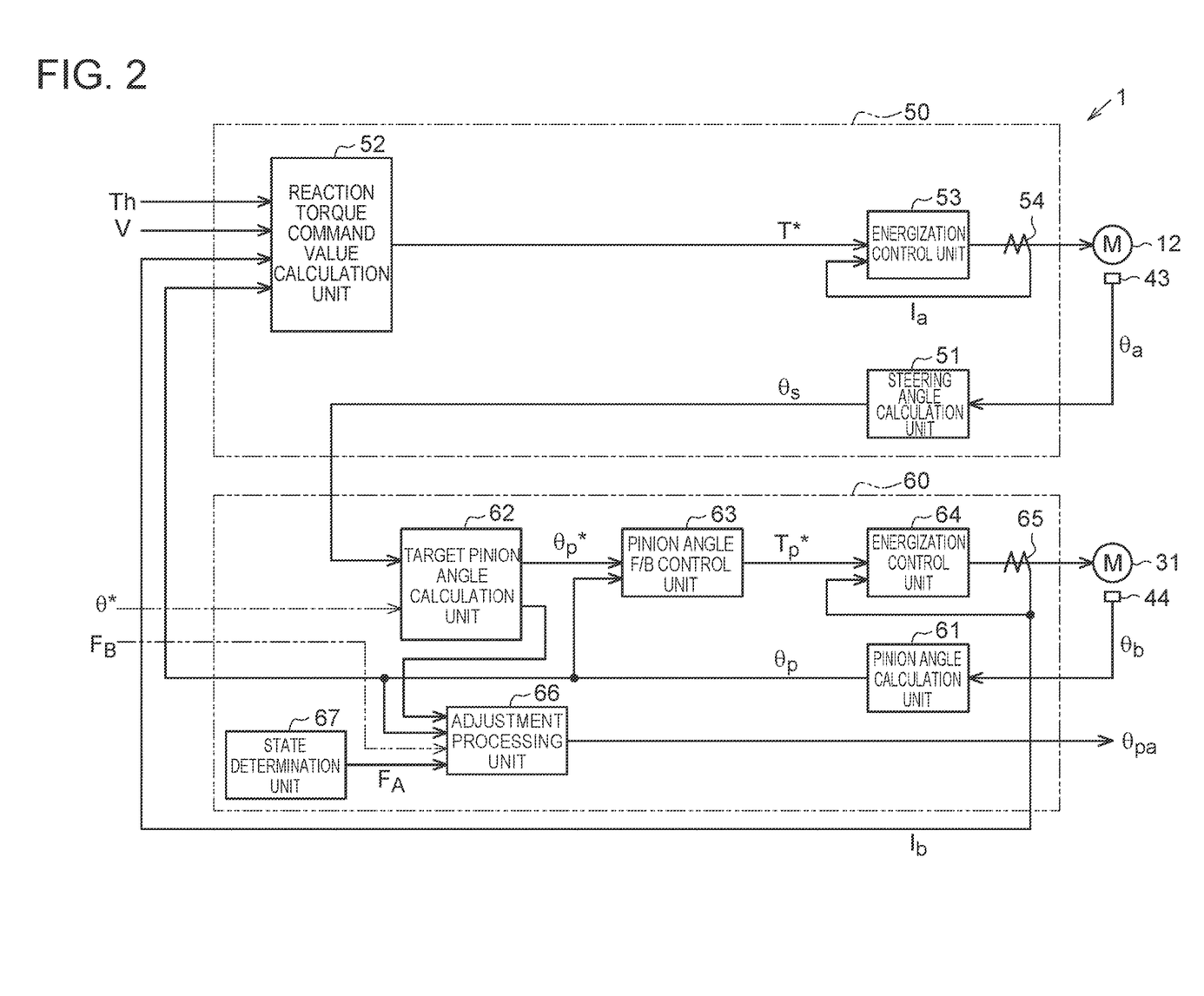
FIG. 2 is a block diagram of the embodiment of the steering control device.

Next, the configuration of the steering control device 1 will be described. As shown in FIG. 2, the steering control device 1 includes a reaction force control unit 50 that executes a reaction force control and a turning control unit 60 that executes a turning control.

The reaction force control unit 50 includes a steering angle calculation unit 51, a reaction torque command value calculation unit 52 and an energization control unit 53. The steering angle calculation unit 51 calculates a steering angle $\theta_s$ of the steering wheel 5, based on the rotation angle $\theta_a$ of the reaction motor 12 that is detected through the rotation angle sensor 43.

The reaction torque command value calculation unit 52 calculates a reaction torque command value T*. The reaction torque command value T* is a target value of the steering reaction force that is to be generated by reaction motor 12. The steering reaction force is a torque in the opposite direction of the steering direction of the steering wheel 5.

The reaction torque command value calculation unit 52 takes the steering torque Th detected through the torque sensor 42 and the vehicle velocity V detected through the vehicle velocity sensor 41. The reaction torque command value calculation unit 52 calculates an assist torque command value based on the steering torque Th and the vehicle velocity V. The assist torque command value corresponds to a target value of an assist torque in the case where the steering device 2 is an electric power steering device. The assist torque is a force for supporting the steering of the steering wheel 5. The assist torque command value is a torque in the same direction as the steering direction of the steering wheel 5. The absolute value of the assist torque command value is larger as the absolute value of the steering torque Th is larger and the vehicle velocity V is lower.

The reaction torque command value calculation unit 52 takes the pinion angle $\theta_p$ calculated by the pinion angle calculation unit 61 and the value of an electric current $I_b$ of the turning motor 31 that is detected through a current sensor 65. The reaction torque command value calculation unit 52 calculates a shaft force that acts on the turning shaft 22, based on the pinion angle $\theta_p$ and the value of the electric current $I_b$ of the turning motor 31. The reaction torque command value calculation unit 52 calculates a shaft force torque by converting the calculated shaft force into the torque for the steering shaft 11. The reaction torque command value calculation unit 52 calculates the reaction torque command value T* by subtracting the shaft force torque from the assist torque command value.

The energization control unit 53 supplies an electric power corresponding to the reaction torque command value T*, to the reaction motor 12. Specifically, the energization control unit 53 calculates an electric current command value for the reaction motor 12, based on the reaction torque command value T*. The energization control unit 53 detects the value of an electric current $I_a$ generated on an electricity supply pathway to the reaction motor 12, through a current sensor 54 provided on the electricity supply pathway. The value of the electric current $I_a$ is the value of the electric current that is supplied to the reaction motor 12. The energization control unit 53 evaluates the difference between the electric current command value and the value of the electric current $I_a$, and controls the electricity supply to the reaction motor 12 such that the difference is eliminated. Thereby, the reaction motor 12 generates a torque corresponding to the reaction torque command value T*.

The turning control unit 60 includes a pinion angle calculation unit 61, a target pinion angle calculation unit 62, a pinion angle feedback control unit 63 and an energization control unit 64. The pinion angle calculation unit 61 calculates the pinion angle $\theta_p$ based on the rotation angle $\theta_b$ of the turning motor 31 that is detected through the rotation angle sensor 44. The pinion angle $\theta_p$ is the rotation angle of the pinion shaft 21. The turning motor 31 and the pinion shaft 21 coordinate with each other through the transmission mechanism 32, the transformation mechanism 33 and the turning shaft 22. Therefore, there is a correlation between the rotation angle $\theta_b$ of the turning motor 31 and the pinion angle $\theta_p$. Using this correlation, it is possible to evaluate (determine) the pinion angle $\theta_p$ from the rotation angle $\theta_b$ of the turning motor 31. The pinion shaft 21 engages with the turning shaft 22. Therefore, there is also a correlation between the pinion angle $\theta_p$ and the movement amount of the turning shaft 22. That is, the pinion angle $\theta_p$ is a value that reflects the turning angle $\theta_w$ of the turning wheels 6.

The target pinion angle calculation unit 62 calculates a target pinion angle $\theta_p^*$ based on the steering angle $\theta_s$ calculated by the steering angle calculation unit 51. The target pinion angle calculation unit 62 calculates the target pinion angle $\theta_p^*$ such that a rudder angle ratio set depending on the product specification and the like is realized. The rudder angle ratio is the ratio of the turning angle $\theta_w$ to the steering angle $\theta_s$.

For example, the target pinion angle calculation unit 62 sets the rudder angle ratio depending on the traveling state of the vehicle as exemplified by the vehicle velocity V, and calculates the target pinion angle $\theta_p{}^*$ depending on the set rudder angle ratio. The target pinion angle calculation unit 62 calculates the target pinion angle $\theta_p{}^*$ such that the turning angle $\theta_w$ with respect to the steering angle $\theta_s$ is larger as the vehicle velocity V is lower. The target pinion angle calculation unit 62 calculates the target pinion angle $\theta_p{}^*$ such that the turning angle $\theta_w$ with respect to the steering angle $\theta_s$ is smaller as the vehicle velocity V is higher. For realizing the rudder angle ratio set depending on the traveling state of the vehicle, the target pinion angle calculation unit 62 calculates a correction angle for the steering angle $\theta_s$, and calculates the target pinion angle $\theta_p{}^*$ corresponding to the rudder angle ratio by adding the calculated correction angle to the steering angle $\theta_s$.

Depending on the product specification and the like, the target pinion angle calculation unit 62 may calculate the target pinion angle $\theta_p{}^*$ such that the rudder angle ratio is "1:1", regardless of the traveling state of the vehicle.

The pinion angle feedback control unit 63 takes the target pinion angle $\theta_p{}^*$ calculated by the target pinion angle calculation unit 62 and the pinion angle $\theta_p$ calculated by the pinion angle calculation unit 61. The pinion angle feedback control unit 63 calculates a turning torque command value $T_p{}^*$ while performing the feedback control of the pinion angle $\theta_p$ such that the pinion angle $\theta_p$ follows the target pinion angle $\theta_p{}^*$. The turning torque command value $T_p{}^*$ is a target value of the turning force.

The energization control unit 64 supplies an electric power corresponding to the turning torque command value $T_p{}^*$, to the turning motor 31. Specifically, the energization control unit 64 calculates an electric current command value for the turning motor 31, based on the turning torque command value $T_p{}^*$. The energization control unit 64 detects the value of an electric current $I_b$ generated on an electricity supply pathway to the turning motor 31, through a current sensor 65 provided on the electricity supply pathway. The value of the electric current $I_b$ is the value of the electric current that is supplied to the turning motor 31. The energization control unit 64 evaluates the difference between the electric current command value and the value of the electric current $I_b$, and controls the electricity supply to the turning motor 31 such that the difference is eliminated. Thereby, the turning motor 31 generates a torque corresponding to the turning torque command value $T_p{}^*$.

The turning control unit 60 includes an adjustment processing unit 66 and a state determination unit 67. The adjustment processing unit 66 calculates the turning state amount that is used when the driving assistance control device 45 executes the back guide monitor function. For example, the turning state amount is the pinion angle $\theta_p$. The adjustment processing unit 66 calculates the pinion angle $\theta_{pa}$ for the back guide monitor function that is used by the driving assistance control device 45, by adjusting the pinion angle $\theta_p$ calculated by the pinion angle calculation unit 61.

For example, the adjustment processing unit 66 may start the operation at the time when the value of the driving assistance request flag $F_B$ is switched to "1". When the value of the driving assistance request flag $F_B$ is "0", the adjustment processing unit 66 is maintained in a state where the operation is stopped.

The state determination unit 67 sets the value of a start-up determination flag $F_A$, depending on whether a vehicle electric power source is switched on. The vehicle electric power source is switched between an on-state and an off-state, by the operation of a start-up switch that is provided at the driver's seat. When a wake-up signal is taken, the state determination unit 67 determines that the vehicle electric power source is in the on-state. When the wake-up signal is not taken, the state determination unit 67 determines that the vehicle electric power source is in the off-state.

The wake-up signal is a start-up signal for the steering control device 1. The wake-up signal is an electric power (voltage) that is supplied to the steering control device 1, for example, through an ignition switch, when an electric power source position of the vehicle is an on-position. When the vehicle electric power source is switched on, the state determination unit 67 sets the value of the start-up determination flag $F_A$ to "1". When the vehicle electric power source is switched off, the state determination unit 67 sets the value of the start-up determination flag $F_A$ to "0".

When the vehicle electric power source is switched off, the steering control device 1 transitions from an ordinary operation state to a sleep state in a power-saving mode. In the sleep state, the steering control device 1 is in a state where the electric power source has been switched off except for some electronic circuits. In the sleep state when the vehicle electric power source is switched on, the steering control device 1 is started up, and transitions from the sleep state to the ordinary operation state. The ordinary operation state is a state where the power-saving operation state has been cancelled.

Detailed Configuration of Target Pinion Angle Calculation Unit 62

Figure 3:
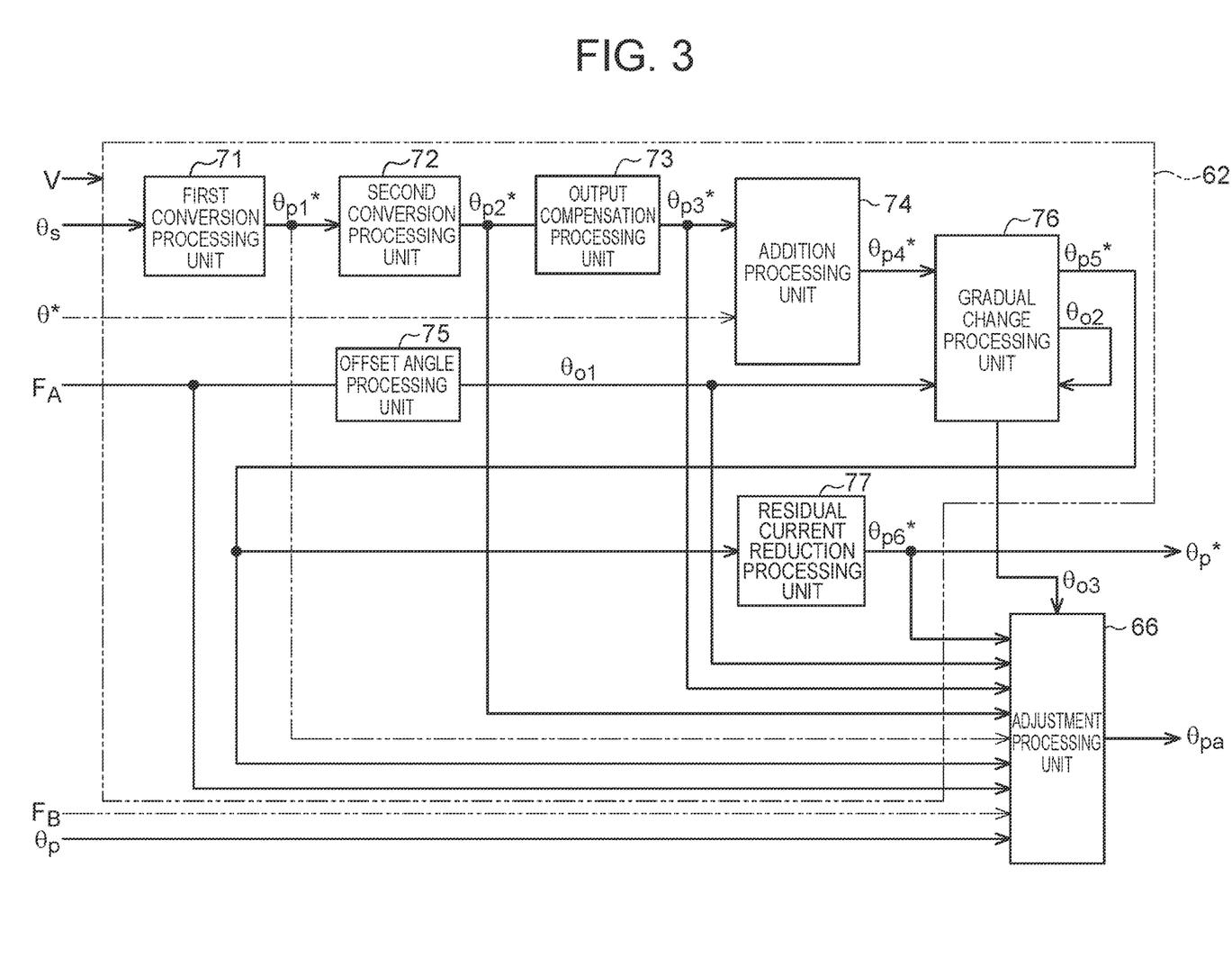
FIG. 3 is a block diagram of a target pinion angle calculation unit in the embodiment.

Next, the configuration of the target pinion angle calculation unit 62 will be described in detail. As shown in FIG. 3, the target pinion angle calculation unit 62 includes a first conversion processing unit 71, a second conversion processing unit 72, an output compensation processing unit 73, an addition processing unit 74, an offset angle calculation unit 75, a gradual change processing unit 76 and a residual current reduction processing unit 77.

The first conversion processing unit 71 takes the steering angle $\theta_s$ calculated by the steering angle calculation unit 51. The first conversion processing unit 71 converts the steering angle $\theta_s$ into a first target pinion angle $\theta_{p1}{}^*$. For example, the first conversion processing unit 71 calculates the first target pinion angle $\theta_{p1}{}^*$ by adding an adjustment amount to the steering angle $\theta_s$. The adjustment amount is an angle that is to be added to the steering angle $\theta_s$ for converting the steering angle $\theta_s$ into the pinion angle $\theta_p$ based on the rudder angle ratio that is the ratio of the turning angle $\theta_w$ to the steering angle $\theta_s$. The rudder angle ratio defines a static characteristic between the steering angle $\theta_s$ and the turning angle $\theta_w$. The first conversion processing unit 71 changes the value of the adjustment amount, depending on the value of the vehicle velocity V. For example, the first conversion processing unit 71 changes the value of the adjustment amount such that the change in the first target pinion angle $\theta_{p1}{}^*$ with respect to the change in the steering angle $\theta_s$ is larger as the vehicle velocity V is lower.

The second conversion processing unit 72 takes the first target pinion angle $\theta_{p1}{}^*$. The second conversion processing unit 72 includes a filter. The second conversion processing unit 72 calculates a second target pinion angle $\theta_{p2}{}^*$ by performing a filtering process to the first target pinion angle $\theta_{p1}{}^*$. For example, the filter has a transfer function that defines a dynamic characteristic corresponding to the vehicle velocity V. That is, the second conversion processing unit 72 converts the first target pinion angle $\theta_{p1}{}^*$ into the second target pinion angle $\theta_{p2}{}^*$, such that a desired characteristic is obtained between the steering angle $\theta_s$ and the second target pinion angle $\theta_{p2}^*$ from a dynamic standpoint corresponding to the vehicle velocity V.

The output compensation processing unit 73 takes the second target pinion angle $\theta_{p2}^*$. The output compensation processing unit 73 executes a process to compensate an output shortage of the turning motor 31. The shaft force that acts on the turning shaft 22 is higher as the turning shaft 22 is closer to a limit position in a physically movable range. A predetermined range from the limit position in the physically movable range of the turning shaft 22 towards a turning neutral position corresponding to a straight movement state of the vehicle is set as a high shaft force range in which the shaft force is higher. For example, the high shaft force range is set based on the maximum torque that can be generated by the turning motor 31.

For example, the output compensation processing unit 73 recognizes the position of the turning shaft 22 relative to the turning neutral position, based on the rotation angle $\theta_b$ of the turning motor 31. When the turning shaft 22 moves to a position in the high shaft force range, the output compensation processing unit 73 corrects the value of the second target pinion angle $\theta_{p2}^*$ such that the position of the turning shaft 22 departs from the high shaft force range to the turning neutral position side. The output compensation processing unit 73 calculates a correction angle for the second target pinion angle $\theta_{p2}^*$, depending on the position of the turning shaft 22. The output compensation processing unit 73 calculates a third target pinion angle $\theta_{p3}^*$ by subtracting the correction angle from the second target pinion angle $\theta_{p2}^*$.

The limit position in the physically movable range of the turning shaft 22 is a position where the movement range of the turning shaft 22 is physically restricted by the occurrence of a so-called end contact. The end contact means that the rack end 24 that is an end portion of the turning shaft 22 comes in contact with the housing 23.

The addition processing unit 74 takes the third target pinion angle $\theta_{p3}^*$ calculated by the output compensation processing unit 73. Further, in the case where the command value $\theta^*$ is generated by the driving assistance control device 45, the addition processing unit 74 takes the command value $\theta^*$. In the case where the command value $\theta^*$ is generated by the driving assistance control device 45, the addition processing unit 74 calculates a fourth target pinion angle $\theta_{p4}^*$ by adding the command value $\theta^*$ to the third target pinion angle $\theta_{p3}^*$. In the case where the command value $\theta^*$ is not generated by the driving assistance control device 45, the third target pinion angle $\theta_{p3}^*$ becomes the fourth target pinion angle $\theta_{p4}^*$ with no change.

At the time of the start-up of the steering control device 1, the offset angle calculation unit 75 calculates an offset angle $\theta_{o1}$. The offset angle $\theta_{o1}$ is a deviation amount between the target pinion angle $\theta_p^*$ calculated based on the present steering angle $\theta_s$ when the vehicle electric power source is switched on and the pinion angle $\theta_p$ corresponding to the present turning angle $\theta_w$ when the vehicle electric power source is switched on. The value of the pinion angle $\theta_p$ may be a value that is calculated based on the rotation angle $\theta_b$ of the turning motor 31 when the vehicle electric power source is switched on, or may be a value that was stored in a storage device of the steering control device 1 when the vehicle electric power source was switched off last time.

The offset angle calculation unit 75 takes the value of the start-up determination flag $F_A$ set by the state determination unit 67. Based on the value of the start-up determination flag $F_A$, the offset angle calculation unit 75 recognizes that the vehicle electric power source has been switched on and further that the steering control device 1 has been started up. When the value of the start-up determination flag $F_A$ is "1", that is, when the vehicle electric power source is in the on-state, the offset angle calculation unit 75 calculates the offset angle $\theta_{o1}$. When the value of the start-up determination flag $F_A$ is "0", that is, when the vehicle electric power source is in the off-state, the offset angle calculation unit 75 does not calculate the offset angle $\theta_{o1}$.

The gradual change processing unit 76 takes the fourth target pinion angle $\theta_{p4}^*$ and the offset angle $\theta_{o1}$. The gradual change processing unit 76 has an upper limit value and a lower limit value for the absolute value of the offset angle $\theta_{o1}$. In the case where the absolute value of the offset angle $\theta_{o1}$ is above the upper limit value or in the case where the absolute value of the offset angle $\theta_{o1}$ is below the lower limit value, the gradual change processing unit 76 calculates an offset remaining amount value $\theta_{o2}$. The offset remaining amount value $\theta_{o2}$ is the value of the difference between the absolute value of the offset angle $\theta_{o1}$ and the upper limit value, or the value of the difference between the absolute value of the offset angle $\theta_{o1}$ and the lower limit value. The gradual change processing unit 76 calculates a final offset angle $\theta_{o3}$ by subtracting the value of the difference between the offset angle $\theta_{o1}$ and the upper limit value or the value of the difference between the absolute value of the offset angle $\theta_{o1}$ and the lower limit value from the absolute value of the offset angle $\theta_{o1}$.

When the absolute value of the offset angle $\theta_{o1}$ is a value within the range designated by the upper limit value and the lower limit value, the final offset angle $\theta_{o3}$ is the same as the value of the offset angle $\theta_{o1}$. The gradual change processing unit 76 calculates a fifth target pinion angle $\theta_{p5}^*$ by adding the final offset angle $\theta_{O3}$ to the fourth target pinion angle $\theta_{p4}^*$. The gradual change processing unit 76 performs, however, a gradual change process with respect to time, to the final offset angle $\theta_{o3}$. The gradual change processing unit 76 gradually changes the final offset angle $\theta_{o3}$ toward "zero", depending on the steering state of the steering wheel 5 by the driver. For example, the gradual change processing unit 76 recognizes the steering state of the steering wheel 5 based on the steering angle $\theta_s$ or steering angular velocity. The steering angular velocity is obtained by differentiating the steering angle $\theta_s$.

The residual current reduction processing unit 77 takes the fifth target pinion angle $\theta_{p5}^*$. The residual current reduction processing unit 77 executes a process to reduce the residual current that is generated in the turning motor 31. For example, the residual current is generated because of the twist of a tire due to the execution of the feedback control of the pinion angle $\theta_p$. The residual current is regularly generated. The residual current reduction processing unit 77 calculates the value of the residual current based on the value of the electric current $I_b$ of the turning motor 31 or the electric current command value for the turning motor 31. The residual current reduction processing unit 77 calculates a correction angle for reducing the residual current, based on the value of the residual current. The correction angle is the rotation angle of the pinion shaft 21. The residual current reduction processing unit 77 calculates the final target pinion angle $\theta_p^*$ by subtracting the correction angle from the fifth target pinion angle $\theta_{p5}^*$.

Detailed Configuration of Adjustment Processing Unit 66

Figure 4:
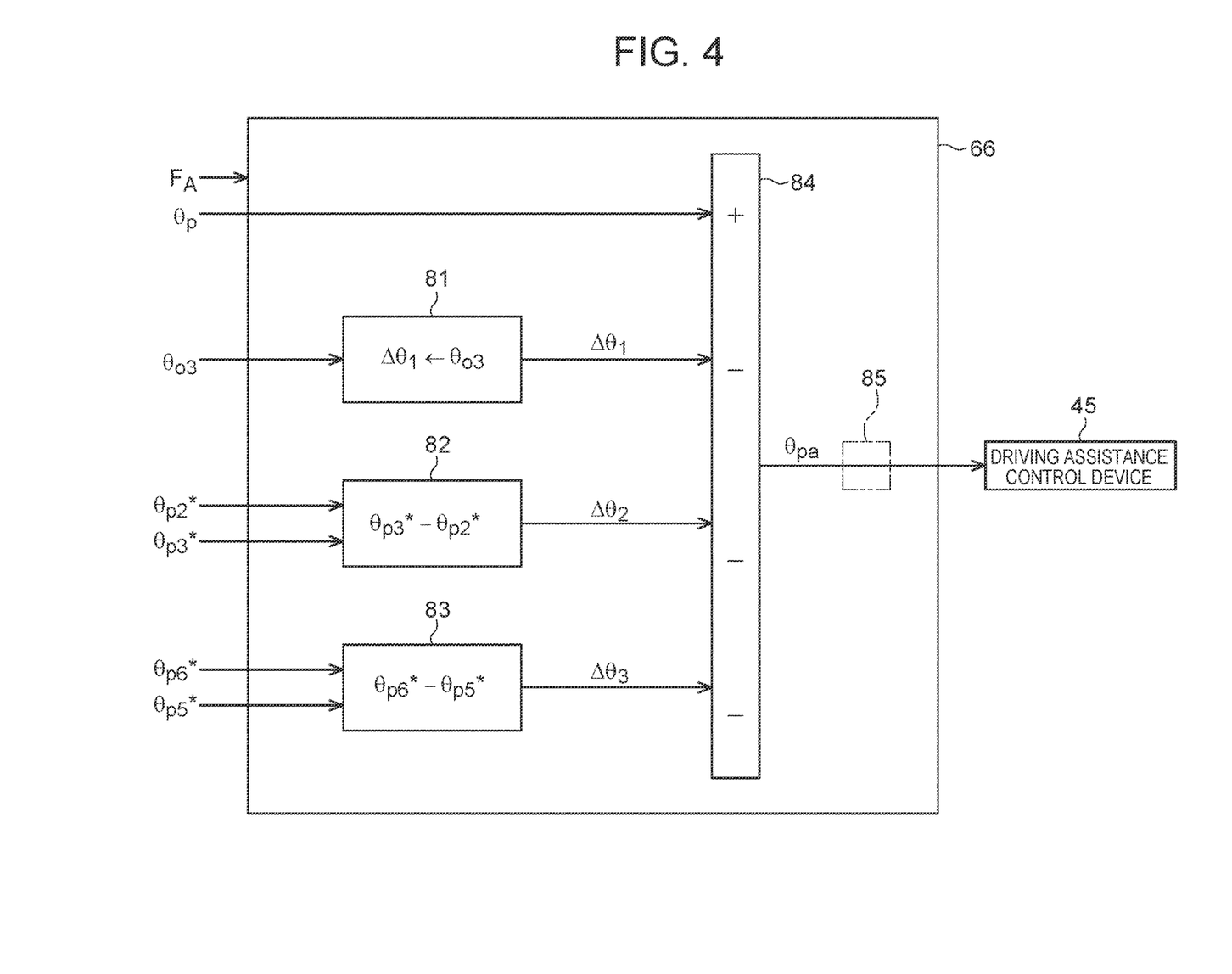
FIG. 4 is a block diagram of an adjustment processing unit in the embodiment.

Next, the configuration of the adjustment processing unit 66 will be described in detail. The adjustment processing unit 66 calculates the pinion angle $\theta_{pa}$ that is the turning state amount that is used when the driving assistance control device 45 executes the back guide monitor function. The adjustment processing unit 66 calculates the pinion angle $\theta_{pa}$ for the back guide monitor function, by reducing or removing the influence of the change in the target pinion angle $\theta_p^*$ due to the execution of the following three processes, from the pinion angle $\theta_p$ calculated by the pinion angle calculation unit 61.

B1. First Alteration Process

The first alteration process is an alteration process for the target pinion angle $\theta_p^*$ that is executed by the offset angle calculation unit 75 and the gradual change processing unit 76.

B2. Second Alteration Process

The second alteration process is an alteration process for the target pinion angle $\theta_p^*$ that is executed by the output compensation processing unit 73.

B3. Third Alteration Process

The third alteration process is an alteration process for the target pinion angle $\theta_p^*$ that is executed by the residual current reduction processing unit 77.

The value of the target pinion angle $\theta_p^*$ is altered through the execution of the three processes B1 to B3. The three processes B1 to B3 are executed independently of the steering state of the steering wheel 5 by the driver. The three processes B1 to B3 are processes that are executed for the convenience of the steering device 2 or from a standpoint of the product specification. That is, the change amount of the target pinion angle $\theta_p^*$ due to the execution of the three processes B1 to B3 is an amount that is changed for the convenience of the steering device 2 or from a standpoint of the product specification.

The pinion angle feedback control unit 63 executes the feedback control of the pinion angle $\theta_p$ such that the pinion angle $\theta_p$ calculated by the pinion angle calculation unit 61 follows the target pinion angle $\theta_p^*$. Therefore, the value of the pinion angle $\theta_p$ calculated by the pinion angle calculation unit 61 is different from the original value of the target pinion angle $\theta_p^*$ based on the steering angle $\theta_s$ calculated by the first conversion processing unit 71. The target pinion angle $\theta_p^*$ calculated by the first conversion processing unit 71 is a value depending on the steering state of the steering wheel 5 by the driver.

Accordingly, in the case where the pinion angle $\theta_p$ for which the feedback control is performed based on the target pinion angle $\theta_p^*$ obtained after the three processes B1 to B3 is used for the execution of the back guide monitor function, there is a fear that the guide for the rearward movement of the vehicle cannot be appropriately performed. Further, there is a fear that the driver has a strangeness feeling about the guide different from the steering state of the steering wheel 5. Therefore, it is preferable that the pinion angle $\theta_{pa}$ to be used at the time of the execution of the back guide monitor function be a pinion angle in which the influence of the change in the target pinion angle $\theta_p^*$ due to the execution of the three processes B1 to B3 has been reduced or removed.

Hence, in the embodiment, the following configuration is employed as the configuration of the adjustment processing unit 66. As shown in FIG. 4, for example, the adjustment processing unit 66 starts the operation at the time when the value of the start-up determination flag $F_A$ is set to "1". The adjustment processing unit 66 includes a first change amount calculation unit 81, a second change amount calculation unit 82, a third change amount calculation unit 83 and a calculator 84.

For example, the first change amount calculation unit 81 acquires the final offset angle $\theta_{o3}$ calculated by the gradual change processing unit 76, as a first change amount $\Delta\theta_1$. The first change amount $\Delta\theta_1$ is the change amount of the target pinion angle $\theta_p^*$ due to the execution of the processes by the offset angle calculation unit 75 and the gradual change processing unit 76.

The first change amount calculation unit 81 may calculate the first change amount $\Delta\theta_1$ by multiplying the final offset angle $\theta_{o3}$ by a prescribed gain. The value of the gain is set from a standpoint of the reduction in the influence of the change in the target pinion angle $\theta_p^*$ due to the execution of the processes by the offset angle calculation unit 75 and the gradual change processing unit 76. The value of the gain may be "1".

The second change amount calculation unit 82 calculates a second change amount $\Delta\theta_2$. The second change amount $\Delta\theta_2$ is the change amount of the target pinion angle $\theta_p^*$ due to the execution of the process by the output compensation processing unit 73. The second change amount calculation unit 82 takes the second target pinion angle $\theta_{p2}^*$ calculated by the second conversion processing unit 72 and the third target pinion angle $\theta_{p3}^*$ calculated by the output compensation processing unit 73. The second change amount calculation unit 82 calculates the second change amount $\Delta\theta_2$ by subtracting the second target pinion angle $\theta_{p2}^*$ from the third target pinion angle $\theta_{p3}^*$.

The third change amount calculation unit 83 calculates a third change amount $\Delta\theta_3$. The third change amount $\Delta\theta_3$ is the change amount of the target pinion angle $\theta_p^*$ due to the execution of the process by the residual current reduction processing unit 77. The third change amount calculation unit 83 takes the fifth target pinion angle $\theta_{p5}^*$ calculated by the gradual change processing unit 76 and the final target pinion angle $\theta_p^*$ calculated by the residual current reduction processing unit 77. The third change amount calculation unit 83 calculates the third change amount $\Delta\theta_3$ by subtracting the fifth target pinion angle $\theta_{p5}^*$ from the final target pinion angle $\theta_p^*$.

The calculator 84 takes the value of the pinion angle $\theta_p$ calculated by the pinion angle calculation unit 61. Further, the calculator 84 takes the first change amount $\Delta\theta_1$ calculated by the first change amount calculation unit 81, the second change amount $\Delta\theta_2$ calculated by the second change amount calculation unit 82 and the third change amount $\Delta\theta_3$ calculated by the third change amount calculation unit 83.

When the value of the start-up determination flag $F_A$ is switched from "0" to "1", that is, when the vehicle electric power source is switched on, the calculator 84 calculates the pinion angle $\theta_{pa}$ for the back guide monitor function by executing the following processes. That is, the calculator 84 subtracts the first change amount $\Delta\theta_1$ from the value of the pinion angle $\theta_p$ calculated by the pinion angle calculation unit 61. Further, the calculator 84 subtracts the second change amount $\Delta\theta_2$ and the third change amount $\Delta\theta_3$ from the value of the pinion angle $\theta_p$ calculated by the pinion angle calculation unit 61. Through the execution of these calculation processes, the calculator 84 calculates the pinion angle $\theta_{pa}$ for the back guide monitor function.

Correspondence Relation

The pinion shaft 21 corresponds to the shaft that rotates in conjunction with the turning operation of the turning wheel 6. The target pinion angle $\theta_p^*$ corresponds to the target angle of the shaft that rotates in conjunction with the turning operation of the turning wheel 6. The pinion angle $\theta_p$ corresponds to the actual angle that is the actual rotation angle of the shaft that rotates in conjunction with the turning operation of the turning wheel 6.

The output compensation processing unit 73, the offset angle calculation unit 75 and the residual current reduction processing unit 77 constitute the first processing unit. The first processing unit is a processing unit that executes a process to alter the target pinion angle $\theta_p^*$ independently of the steering state of the steering wheel 5.

The adjustment processing unit 66 corresponds to the second processing unit. The second processing unit is a processing unit that calculates the turning state amount for the back guide monitor function by reducing or removing the influence of the alteration of the target pinion angle $\theta_p^*$ that is performed independently of the steering state of the steering wheel 5 on the pinion angle $\theta_p$. The pinion angle $\theta_{pa}$ calculated by the adjustment processing unit 66 corresponds to the turning state amount for the back guide monitor function.

Operation of Embodiment

The embodiment exerts the following operation. Basically, the value of the first change amount $\Delta\theta_1$ is the same as the value of the final offset angle $\theta_{o3}$ calculated by the gradual change processing unit 76. The influence of the change in the target pinion angle $\theta_p^*$ due to the execution of the above process B1 by the offset angle calculation unit 75 is removed or reduced from the pinion angle $\theta_p$, by subtracting the first change amount $\Delta\theta_1$ from the pinion angle $\theta_p$ calculated by the pinion angle calculation unit 61. That is, the pinion angle $\theta_{pa}$ for the back guide monitor function is an angle in which the influence of the change in the target pinion angle $\theta_p^*$ due to the execution of the above process B1 at the time of the start-up of the steering control device 1 has been removed or reduced.

The second change amount $\Delta\theta_2$ is the change amount of the target pinion angle $\theta_p^*$ due to the execution of the process by the output compensation processing unit 73. The influence of the change in the target pinion angle $\theta_p^*$ due to the execution of the above process B2 by the output compensation processing unit 73 is removed or reduced from the pinion angle $\theta_p$, by subtracting the second change amount $\Delta\theta_2$ from the pinion angle $\theta_p$ calculated by the pinion angle calculation unit 61. That is, the pinion angle $\theta_{pa}$ for the back guide monitor function is an angle in which the influence of the change in the target pinion angle $\theta_p^*$ due to the execution of the above process B2 has been removed or reduced.

The third change amount $\Delta\theta_3$ is the change amount of the target pinion angle $\theta_p^*$ due to the execution of the process by the residual current reduction processing unit 77. The influence of the change in the target pinion angle $\theta_p^*$ due to the execution of the above process B3 by the residual current reduction processing unit 77 is removed or reduced from the pinion angle $\theta_p$, by subtracting the third change amount $\Delta\theta_3$ from the pinion angle $\theta_p$ calculated by the pinion angle calculation unit 61. That is, the pinion angle $\theta_{pa}$ for the back guide monitor function is an angle in which the influence of the change in the target pinion angle $\theta_p^*$ due to the execution of the above process B3 has been removed or reduced.

The driving assistance control device 45 executes the back guide monitor function, using the pinion angle $\theta_{pa}$ for the back guide monitor function that is calculated by the adjustment processing unit 66. The pinion angle $\theta_{pa}$ for the back guide monitor function is an angle in which the influence of the change in the target pinion angle $\theta_p^*$ due to the above processes B1 to B3 that are executed independently of the steering state of the steering wheel 5 has been removed or reduced. That is, the pinion angle $\theta_{pa}$ for the back guide monitor function is an angle close to the virtual pinion angle $\theta_p$ depending on the steering state of the steering wheel 5. Therefore, the driving assistance control device 45 can execute the back guide monitor function in keeping with the steering state of the steering wheel 5.

Effects of Embodiment

The embodiment exerts the following effects.

(1) For the convenience of the steering device 2 or from a standpoint of the product specification, the steering control device 1 sometimes changes the target pinion angle $\theta_p^*$ independently of the steering state of the steering wheel 5. At the time of the execution of the back guide monitor function, the driving assistance control device 45 uses the pinion angle $\theta_{pa}$ for the back guide monitor function that is calculated by the adjustment processing unit 66. The pinion angle $\theta_{pa}$ is an angle in which the influence of the change in the target pinion angle $\theta_p^*$ due to the above processes B1 to B3 that are executed independently of the steering state of the steering wheel 5 has been removed or reduced. Therefore, the driving assistance control device 45 can execute the back guide monitor function in keeping with the steering state of the steering wheel 5. Accordingly, it is possible to restrain the driver from having a strangeness feeling about the guide display due to the execution of the back guide monitor function.

(2) The adjustment processing unit 66 can easily calculate the pinion angle $\theta_{pa}$ that is used for the guide monitor display, by subtracting the change amount of the target pinion angle $\theta_p^*$ due to the process performed independently of the steering state of the steering wheel 5, from the pinion angle $\theta_p$ calculated by the pinion angle calculation unit 61.

(3) When the vehicle electric power source is switched on, the target pinion angle $\theta_p^*$ reflects the offset angle $\theta_{o1}$, more properly, the final offset angle $\theta_{o3}$ restricted to a value in the range designated by the upper limit value and the lower limit value. The offset angle $\theta_{o1}$ is the deviation amount between the target pinion angle $\theta_p^*$ that is calculated based on the present steering angle $\theta_s$ and the target pinion angle $\theta_p^*$ corresponding to the actual turning angle $\theta_w$. The final offset angle $\theta_{o3}$ that is reflected in the target pinion angle $\theta_p^*$ is gradually decreased with time. Therefore, it is possible to restrain sudden changes in the target pinion angle $\theta_p^*$ and further the turning angle $\theta_w$, when the vehicle electric power source is switched on. Therefore, it is possible to suitably restrain the driver from having a strangeness feeling.

(4) The adjustment processing unit 66 takes the final offset angle $\theta_{o3}$ as the first change amount $\Delta\theta_1$. The adjustment processing unit 66 can easily calculate the pinion angle $\theta_{pa}$ in which the influence of the change in the target pinion angle $\theta_p^*$ due to the execution of the processes by the offset angle calculation unit 75 and the gradual change processing unit 76 has been removed, by subtracting the first change amount $\Delta\theta_1$ from the pinion angle $\theta_p$ calculated by the pinion angle calculation unit 61.

(5) The output compensation processing unit 73 executes the process to compensate an output shortage of the turning motor 31. That is, when the position of the turning shaft 22 moves to a position in the high shaft force range, the output compensation processing unit 73 alters the value of the target pinion angle $\theta_p^*$ such that the position of the turning shaft 22 departs from the high shaft force range to the turning neutral position side. Therefore, it is possible to restrain the occurrence of a situation where the output of the turning motor 31 is insufficient. Therefore, it is possible to restrain the driver from having a strangeness feeling caused by an insufficient output of the turning motor 31.

(6) The adjustment processing unit 66 takes the second target pinion angle $\theta_{p2}{}^*$ before the execution of the process by the output compensation processing unit 73 and the third target pinion angle $\theta_{p3}{}^*$ after the execution of the process by the output compensation processing unit 73. The adjustment processing unit 66 calculates the second change amount $\Delta\theta_2$ by subtracting the second target pinion angle $\theta_{p2}{}^*$ from the third target pinion angle $\theta_{p3}{}^*$. The adjustment processing unit 66 can easily calculate the pinion angle $\theta_{pa}$ in which the influence of the change in the target pinion angle $\theta_p{}^*$ due to the execution of the process by the output compensation processing unit 73 has been removed, by subtracting the second change amount $\Delta\theta_2$ from the pinion angle $\theta_p$ calculated by the pinion angle calculation unit 61.

(7) The residual current reduction processing unit 77 executes the process to reduce the residual current that is generated in the turning motor 31. For example, the residual current reduction processing unit 77 calculates the value of the residual current in the turning motor 31, based on the value of the electric current $I_b$ of the turning motor 31. The residual current reduction processing unit 77 alters the value of the target pinion angle $\theta_p{}^*$ such that the residual current in the turning motor 31 is reduced. Since the residual current in the turning motor 31 is reduced, it is possible to reduce the influence of the residual current on the torque that is generated by the turning motor 31.

(8) The adjustment processing unit 66 takes the fifth target pinion angle $\theta_{p5}{}^*$ before the execution of the process by the residual current reduction processing unit 77 and the final target pinion angle $\theta_p{}^*$ after the execution of the process by the residual current reduction processing unit 77. The adjustment processing unit 66 calculates the third change amount $\Delta\theta_3$ by subtracting the fifth target pinion angle $\theta_{p5}{}^*$ from the final target pinion angle $\theta_p{}^*$. The adjustment processing unit 66 can easily calculate the pinion angle $\theta_{pa}$ in which the influence of the change in the target pinion angle $\theta_p{}^*$ due to the execution of the process by the residual current reduction processing unit 77 has been removed, by subtracting the third change amount $\Delta\theta_3$ from the pinion angle $\theta_p$ calculated by the pinion angle calculation unit 61.

Other Embodiments

The embodiment may be carried out while being modified as follows.

The adjustment processing unit 66 may include a guard processing unit 85. The guard processing unit 85 takes the pinion angle $\theta_{pa}$ for the back guide monitor function that is calculated by the calculator 84. The guard processing unit 85 has an upper limit value and a lower limit value for the pinion angle $\theta_{pa}$. The guard processing unit 85 executes a restriction process for the pinion angle $\theta_{pa}$. In the case where the absolute value of the pinion angle $\theta_{pa}$ is above the upper limit value or in the case where the absolute value of the pinion angle $\theta_{pa}$ is below the lower limit value, the guard processing unit 85 restricts the absolute value of the pinion angle $\theta_{pa}$ to the upper limit value or the lower limit value. By this process, the calculation of the pinion angle $\theta_{pa}$ having an excessively large value is restrained. Further, the delay in following the change in the pinion angle $\theta_{pa}$ is restrained.

The gradual change processing unit 76 does need to have the upper limit value and the lower limit value for the absolute value of the offset angle $\theta_{o1}$ calculated by the offset angle calculation unit 75. In this case, the final offset angle $\theta_{o3}$ is the same as the offset angle $\theta_{o1}$ calculated by the offset angle calculation unit 75.

The adjustment processing unit 66 may take the first target pinion angle $\theta_{p1}{}^*$ calculated by the first conversion processing unit 71, instead of the pinion angle $\theta_p$ calculated by the pinion angle calculation unit 61. The first target pinion angle $\theta_{p1}{}^*$ is a target value of the pinion angle $\theta_p$ that is calculated depending on the steering state of the steering wheel 5. The adjustment processing unit 66 may calculate the pinion angle $\theta_{pa}$ for the back guide monitor function, by subtracting the first change amount $\Delta\theta_1$, the second change amount $\Delta\theta_2$ and the third change amount $\Delta\theta_3$ from the first target pinion angle $\theta_{p1}{}^*$.

A configuration in which the second conversion processing unit 72 is excluded may be employed as the target pinion angle calculation unit 62. In this case, the output compensation processing unit 73 takes the first target pinion angle $\theta_{p1}{}^*$ calculated by the first conversion processing unit 71.

A configuration in which at least one of the output compensation processing unit 73 and the residual current reduction processing unit 77 is excluded may be employed as the target pinion angle calculation unit 62. In the case where the output compensation processing unit 73 is excluded, the addition processing unit 74 takes the second target pinion angle $\theta_{p2}{}^*$ calculated by the second conversion processing unit 72. In the case where the second conversion processing unit 72 and the output compensation processing unit 73 are excluded, the addition processing unit 74 takes the first target pinion angle $\theta_{p1}{}^*$ calculated by the first conversion processing unit 71. In the case where the residual current reduction processing unit 77 is excluded, the final target pinion angle $\theta_p{}^*$ is the second target pinion angle $\theta_{p2}{}^*$ calculated by the gradual change processing unit 76.

For example, the driving assistance function may include a lane keeping assist function, in addition to the parking assist function. The lane keeping assist function is a function to assist the traveling of the vehicle along a vehicle lane by supporting the steering by the driver when the traveling vehicle is about to depart from the vehicle lane. The driving assistance control device 45 sets an additional angle that is an angle to be added to the target pinion angle or the present pinion angle, as a command value for causing the vehicle to travel on a target vehicle lane.

The driving assistance function may include a guide function to display an expected trajectory line indicating a predicted path at the time of the forward movement of the vehicle or the turning angle $\theta_w$ of the turning wheels 6 on the display of the HMI 48, in addition to the parking assist function. For example, the driving assistance control device 45 calculates a predicted path at the time of the forward movement of the vehicle, using the pinion angle $\theta_{pa}$. The driving assistance control device 45 can execute the guide monitor function in keeping with the steering state of the steering wheel 5.

The steering device 2 may include a clutch. In this case, the steering shaft 11 and the pinion shaft 21 are coupled through the clutch. For example, the clutch is an electromagnetic clutch that performs the transmission or interruption of dynamic power by the execution or inexecution of the energization of an exciting coil. The steering control device 1 executes an engagement-disengagement control to switch the engagement-disengagement of the clutch. When the clutch is disengaged, the dynamic power transmission between the steering wheel 5 and the turning wheels 6 is mechanically interrupted. When the clutch is engaged, the dynamic power transmission between the steering wheel 5 and the turning wheels 6 is mechanically coupled.

The right and left turning wheels 6 may be capable of being turned independently of each other. In this case, the steering device 2 includes two turning motors corresponding to the right and left turning wheels 6. The steering control device 1 independently turns the turning wheels 6 by controlling the turning motors corresponding to the turning wheels 6.

What is claimed is:

1. A steering control device for controlling electricity supply to a turning motor generating a turning force for turning a turning wheel of a vehicle and that (i) calculates a target angle of a shaft depending on a steering state of a steering wheel and (ii) executes a feedback control to cause an actual angle of the shaft to follow the target angle, the shaft rotating in conjunction with a turning operation of the turning wheel, which is isolated from dynamic power transmission with the steering wheel, the steering control device comprising a memory and a processor programmed to execute:
a first processing to alter the target angle independently of the steering state of the steering wheel; and
a second processing (i) to calculate a turning state amount for a guide monitor function by reducing or removing an influence of an alteration of the target angle by the first processing on the actual angle of the shaft and (ii) to display the calculated turning state amount on a display of the vehicle to assist a driver during traveling of the vehicle.

2. The steering control device according to claim 1, wherein the second processing executed by the processor calculates the turning state amount by (i) calculating a change amount of the target angle due to the first processing and (ii) subtracting the change amount of the target angle from the actual angle of the shaft or the target angle based on the steering state of the steering wheel.

3. The steering control device according to claim 1, wherein when a vehicle electric power source is switched on, the first processing executed by the processor includes a first alteration process (i) to calculate an offset angle, (ii) to gradually change the offset angle toward zero by performing a gradual change process to the offset angle, and (iii) to alter a value of the target angle by adding the offset angle after the gradual change process to the target angle, the offset angle being a deviation amount between the target angle that is calculated based on a present steering angle of the steering wheel and the actual angle of the shaft that reflects an actual turning state of the turning wheel.

4. The steering control device according to claim 3, wherein the second processing executed by the processor includes a process to take the offset angle after the gradual change process as a first change amount, and to calculate the turning state amount by subtracting the first change amount from the actual angle of the shaft or the target angle based on the steering state of the steering wheel.

5. The steering control device according to claim 3, wherein when a turning shaft for turning the turning wheel moves to a position in a prescribed high shaft force range, the first processing executed by the processor further includes a second alteration process to alter the value of the target angle such that a position of the turning shaft departs from the high shaft force range to a turning neutral position side.

6. The steering control device according to claim 4, wherein when a turning shaft for turning the turning wheel moves to a position in a prescribed high shaft force range, the first processing executed by the processor further includes a second alteration process to alter the value of the target angle such that a position of the turning shaft departs from the high shaft force range to a turning neutral position side.

7. The steering control device according to claim 5, wherein the second processing executed by the processor includes a process (i) to calculate a second change amount by subtracting the target angle before an execution of the second alteration process from the target angle after the execution of the second alteration process, and (ii) to calculate the turning state amount by subtracting the second change amount from the actual angle of the shaft or the target angle based on the steering state of the steering wheel.

8. The steering control device according to claim 3, wherein the first processing executed by the processor further includes a third alteration process to alter the value of the target angle for reducing residual current that is generated in the turning motor.

9. The steering control device according to claim 8, wherein the second processing executed by the processor includes a process (i) to calculate a third change amount by subtracting the target angle before an execution of the third alteration process from the target angle after the execution of the third alteration process, and (ii) to calculate the turning state amount by subtracting the third change amount from the actual angle of the shaft or the target angle based on the steering state of the steering wheel.

10. The steering control device according to claim 1, wherein the turning state amount is a rotation angle of a pinion shaft that engages with a turning shaft to turn the turning wheel.

* * * * *